April 6, 1965 T. J. TULP ETAL 3,177,439
TRANSISTOR AMPLIFIER DEVICES WITH CONTROLLABLE AMPLIFICATION
Filed Dec. 5, 1962
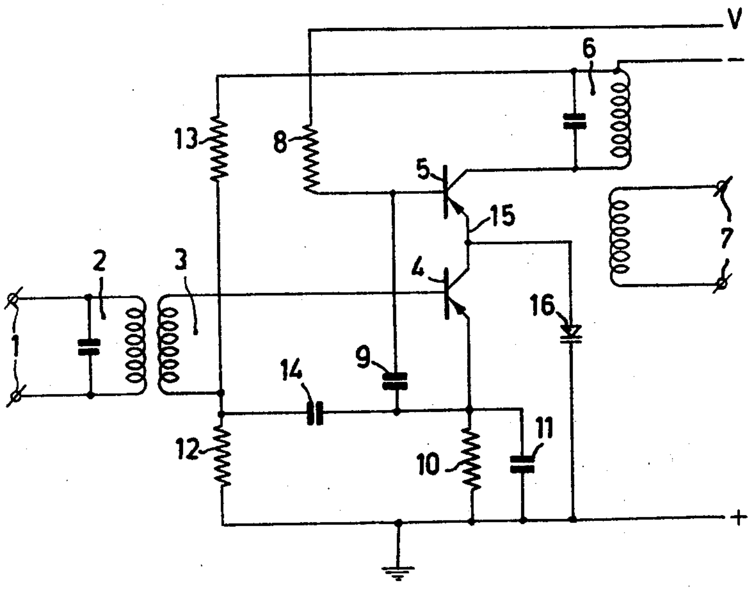
INVENTOR
THEODORUS J. TULP
ADRIANUS J.W.M.VAN OVERBEEK
WILHELMUS A.J.M ZWIJSEN
BY
AGENT United States Patent Office 3,177,439

Patented Apr. 6, 1965

3,177,439

TRANSISTOR AMPLIFIER DEVICES WITH CONTROLLABLE AMPLIFICATION

Theodorus Joannes Tulp, Adrianus Johannes Wilhelmus Marie van Overbeek, and Wilhelmus Antonius Joseph Marie Zwijsen, all of Emmasingel, Eindhoven, Netherlands, assignors to North American Philips Company, Inc., New York, N.Y., a corporation of Delaware Filed Dec. 5, 1962, Ser. No. 242,389
Claims priority, application Netherlands, Dec. 6, 1961, 272,250
5 Claims. (Cl. 330—18)

The invention relates to a transistor amplifier in which the amplification is controlled by controlling the collector direct voltage of a transistor. According to the most usual methods of controlling the transistor amplification, either the emitter direct current or the collector direct voltage may be controlled. In the first case, a smaller amplification is obtained if the emitter direct current is controlled back to a lower value and in the second case a smaller amplification is obtained if the collector direct voltage is controlled back to a lower value. In the normal performance of the latter method, the control quantity is applied to the base of a transistor, in the collector circuit of which a high-value resistor is provided which is decoupled for the signal frequencies and across which the desired direct voltage is set up which causes the amplification of the transistor to decrease.

In devices of this type a range of control of approximately 35 db per stage can be obtained. The object of the invention is to provide means for obtaining a considerably higher range of control. These means also cause another drawback of the known circuit arrangement, viz. that during the control the output impedance of the circuit arrangement varies, to decrease considerably.

According to the invention the emitter-collector path of a first transistor is connected in series with the emitter-collector path of a second transistor and the output signal is derived from the collector of the second transistor. The control quantity varies the direct voltage difference between the bases of the two transistors, and means are provided to maintain the emitter direct current of the first transistor substantially independent of the control quantity, so that as a result of the control the collector direct current of this transistor may decrease to a considerably smaller value than its emitter current.

The said series arrangement of the two transistors is known per se and has the advantages that it has such a high internal output impedance that the control has hardly any influence on the circuit connected in the collector circuit of the second transistor.

The invention is based on the recognition of the fact that varying the base direct voltage of the second transistor also varies the collector direct voltage of the first transistor, as a result of which amplification control is obtained in a known manner. However, it also becomes possible with this arrangement to cause the collector direct current of the first transistor to decrease to a considerably smaller value than in known circuit arrangement. In the known circuit arrangement a decrease of the collector voltage by the control quantity will also be associated with an increase of the base direct current. This increased base current requires a considerable quantity of energy to effectuate control. In the device according to the invention, both the collector direct voltage and the collector direct current can be made very small with little control energy, and both effects contribute to a considerable reduction of the amplification of the transistor.

In order that the invention may be readily carried into effect, one embodiment thereof will now be described more fully, by way of example, with reference to the accompanying drawing.

The circuit illustrated in the drawing comprises an amplifier stage, for example the intermediate-frequency amplifier stage of a wireless receiver set. The signals to be amplified are supplied to the terminals 1 of a circuit 2 tuned to the input frequency which is coupled rather loosely to the base input coil 3 of a transistor amplifier 4. The amplification factor of the transistor 4 is controlled in accordance with a voltage V which controls the collector direct voltage of the transistor 4. The voltage V is preferably proportional to the average amplitude of the signal oscillations and may, for example, be derived from the detector of the receiver. While use of the invention in an automatic volume or gain control circuit is contemplated it is not, however, limited thereto and the control voltage V may be derived from any source or manually selected. In any case the amplification of the circuit is a function of the control voltage V however derived. The impedance of the coil 3 is larger than the base input resistance of the transistor 4.

According to the invention, the emitter-collector path of the transistor 4 is connected in series with that of a second transistor 5 in the collector circuit of which a tuned output circuit 6 is connected. Output oscillations of intermediate frequency are derived from the terminals 7. The voltage V is applied to the base of the transistor 5, the resistor 8 and the capacitor 9 forming a filter for suppressing alternating voltage components possibly present in the control voltage source. The capacitor 9 also serves for connecting the base of the transistor 5 for the frequency of the oscillations applied to the terminals 1 to the emitter of the transistor 4, as a result of which the output impedance of the circuit arrangement is increased considerably. In the emitter lead of the transistor 4 a resistor 10 is connected which is shunted by a capacitor 11 which forms a short-circuit for the frequency of the oscillations supplied to the terminals 1.

When utilized in an automatic volume control configuration, the configuration may be proportioned such that as the signal amplitude at the terminals 1 increases, the control voltage V at the base of the transistor 5 becomes smaller and smaller with respect to ground i.e. (less negative if the transistors 4 and 5 are of the p-n-p-type). As a result of this, the collector voltage of the transistor 4 also decreases to an ever smaller value with respect to ground, as a result of which a considerable amplification reduction occurs. As a result of the resistor 10, however, the emitter direct current through the transistor 4 is fixed at a value which is determined by this resistor and by the bias voltage which is set up at the base of the transistor 4 by means of a potentiometer 12, 13 since the emitter base junction acts as a forward biased diode. If the collector voltage of the transistor 4 decreases to a value which is so low that only a small difference with respect to the emitter voltage remains, the collector direct current will also decrease considerably below the value of the fixed emitter current. As a result of this a considerable additional amplification control is obtained, such that in all an amplification control of more than 60 db may be obtained without materially degrading the frequency-characteristic and the non-linear distortion characteristics of the circuit.

In a practical embodiment, the circuit elements had the following values:

| Transistors | Resistors | Capacitors | Inductance |
|---|---|---|---|
| 4=OC 171<br>5=OC 171 | 8=50 KΩ<br>10=1 KΩ<br>12=1.2 KΩ<br>13=3.9 KΩ | 9=0.5 μf.<br>11=0.1 μf.<br>14=0.1 μf. | 3=2 mh. |

Operating frequency 450 kc./s., supply voltage 12 v.

It has appeared that the device can also readily be used at high frequencies, for example 200 mc./s. In this case it may be used, for example, in the high-frequency amplifier stage of a television receiver. In that case, the impedance of the input signal source will be adapted to the resistance of the base material of the transistor, which impedance, at these high frequencies, usually is larger than that of the internal capacity between the base and the emitter of the transistor.

For further amplification control, the control voltage V may also be supplied to the base of the transistor 4. In addition, the connection lead 15 between the collector of the transistor 4 and the emitter of the transistor 5 may be connected through a voltage-dependent impedance to a point of constant potential. A voltage-dependent capacity, for example a diode 16 operated in the reverse direction may be used as the voltage dependent impedance. Thus the range of control may be extended by a few db especially when the device is used at high frequencies.

What is claimed is:

1. A transistor amplifier comprising first and second transistors each having a base electrode, a collector electrode and an emitter electrode, a source of signals, means applying said signals to the base of said first transistor, a load circuit, means serially connecting the collector-emitter path of said first and second transistors and said load circuit, a source of a control voltage, means for applying said control voltage to the base of said second transistor whereby the direct voltage between the bases of said first and second transistors is varied, and means connected to the base and emitter if said first transistor for maintaining the emitter current of said first transistor substantially independent of said control voltage.

2. A transistor amplifier comprising first and second transistors each having a base electrode, a collector electrode and an emitter electrode, a source of signals, means applying said signals to the base of said first transistor, a source of operating voltage having first and second terminals, a load circuit, a series circuit connected between said first and second terminals comprising the emitter-collector path of said first and second transistors and said load circuit, in that order, a source of a control voltage, means for applying and control voltage to the base of said second transistor whereby the direct voltage between the bases of said transistors is varied as a function of said control voltage, and means connected to the base and emitter of said first transistor for maintaining the emitter current of said first transistor independent of said control voltage.

3. The amplifier of claim 2, comprising voltage-dependent impedance means, and means connecting said impedance means between the junction of the emitter-collector path of said first and second transistors and said first terminal.

4. A transistor amplifier comprising first and second transistors each having a base electrode, a collector electrode and an emitter electrode, a source of signals, means applying said signals between the base and emitter electrodes of said first transistor, a source of operating voltage having first and second terminals, parallel connected resistor and capacitor circuit means connected between the emitter of said first transistor and said first terminal, means for applying a bias voltage to the base of said first transistor for forward biasing the emitter base junction to provide a direct emitter current substantially determined by the resistance in the said parallel connected resistor capacitor circuit means, means connecting the collector of said first transistor to the emitter of said second transistor, load circuit means connected between said second terminal and the collector of said second transistor, a source of a control voltage, and means applying said control voltage to the base of said second transistor whereby the direct voltage between the bases of said transistors is varied as a function of said control voltage.

5. The amplifier of claim 4, comprising a voltage-dependent capacitor, and means connecting said capacitor between said first terminal and the collector of said first transistor.

References Cited by the Examiner

UNITED STATES PATENTS

| | | | |
|---|---|---|---|
| 2,943,267 | 6/60 | Randise | 330—18 |
| 3,109,103 | 10/63 | Wilhelmsen | 330—29 XR |

FOREIGN PATENTS

| | | |
|---|---|---|
| 412,477 | 6/34 | Great Britain. |

ROY LAKE, *Primary Examiner.*

UNITED STATES PATENT OFFICE

CERTIFICATE OF CORRECTION

Patent No. 3,177,439 April 6, 1965

Theodorus Joannes Tulp et al.

It is hereby certified that error appears in the above numbered patent requiring correction and that the said Letters Patent should read as corrected below.

Column 3, line 46, for "if" read -- of --; column 4, line 6, for "and" read -- said --.

Signed and sealed this 16th day of November 1965.

(SEAL)
Attest:

ERNEST W. SWIDER
Attesting Officer

EDWARD J. BRENNER
Commissioner of Patents